United States Patent
Kawasaki et al.

(10) Patent No.: US 10,955,339 B2
(45) Date of Patent: Mar. 23, 2021

(54) DROPLET SENSOR

(71) Applicants: Yuya Kawasaki, Tokyo (JP); Hideo Kurosawa, Kanagawa (JP)

(72) Inventors: Yuya Kawasaki, Tokyo (JP); Hideo Kurosawa, Kanagawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/801,624

(22) Filed: Feb. 26, 2020

(65) Prior Publication Data

US 2020/0309694 A1 Oct. 1, 2020

(30) Foreign Application Priority Data

Mar. 28, 2019 (JP) .............................. JP2019-064983

(51) Int. Cl.
*G01N 21/552* (2014.01)
*G01J 3/42* (2006.01)
*G01J 3/02* (2006.01)

(52) U.S. Cl.
CPC ............ *G01N 21/552* (2013.01); *G01J 3/021* (2013.01); *G01J 3/42* (2013.01); *G01J 2003/425* (2013.01)

(58) Field of Classification Search
CPC ........ G02B 27/0006; G02B 2027/0118; G02B 2027/012; G02B 2027/0178; G02B 27/01; G02B 27/0101; G02B 27/017; G02B 5/0808; G02B 6/00; G02B 2027/014; G02B 2027/0187; G02B 27/0093; G02B 13/0025; G02B 13/16; G02B 19/0014; G02B 19/0061; G02B 19/0076; G02B 2027/0138; G02B 26/00; G02B 26/004; G02B 26/005; G02B 26/0875; G02B 26/101; G02B 27/00; G02B 27/0172; G02B 27/30;

(Continued)

(56) References Cited

U.S. PATENT DOCUMENTS

| 5,661,303 A * | 8/1997 | Teder ..................... G01N 21/43 250/341.8 |
| 6,361,136 B1 * | 3/2002 | Watanabe ............ B41J 2/17546 347/19 |

(Continued)

FOREIGN PATENT DOCUMENTS

| JP | 2014-211358 | 11/2014 |
| JP | 2014-238383 | 12/2014 |
| JP | 2019-120567 | 7/2019 |

*Primary Examiner* — Michael P Stafira
(74) *Attorney, Agent, or Firm* — IPUSA, PLLC (57) ABSTRACT

A droplet sensor includes an optical cover having an elliptical surface forming a portion of a spheroid, a light source arranged at or in a vicinity of a first focal point of the elliptical surface, and a photodetector arranged at or in a vicinity of a second focal point of the elliptical surface. The elliptical surface includes an effective detection area configured to reflect light emitted from the light source towards the photodetector. An amount of light reflected from the effective detection area changes according to adhesion of a droplet on the effective detection area of the elliptical surface. The optical cover includes a hollow portion that is provided in a region inside the optical cover, and outside optical paths of the light emitted from the light source and reflected from the effective detection area toward the photodetector.

19 Claims, 8 Drawing Sheets

(58) Field of Classification Search
CPC . G02B 3/00; G02B 3/02; G02B 5/208; G02B 6/0208; G02B 6/02209; G02B 7/02; G02B 7/105; G02B 6/0051; G02B 6/0055; G02B 1/118; G02B 27/012; G02B 23/243; G02B 23/2469; G02B 23/26; G02B 27/0955; G02B 3/005; G02B 3/0056; G02B 3/0087; G02B 5/08; G02B 5/201; G02B 5/3016; G02B 5/3058; G02B 5/32; G02B 6/001; G02B 6/0031; G02B 6/0035; G02B 6/0036; G02B 6/005; G02B 6/0061; G02B 6/0076; G02B 6/009; G02B 6/262; G02B 13/0065; G02B 17/0804; G02B 17/0808; G02B 17/0812; G02B 17/0836; G02B 17/0856; G02B 17/0876; G02B 17/0896; G02B 19/0019; G02B 19/0047; G02B 1/12; G02B 2027/0107; G02B 2027/0112; G02B 2027/0123; G02B 2027/013; G02B 2027/015; G02B 2027/0154; G02B 2027/0185; G02B 2027/0196; G02B 21/002; G02B 21/0052; G02B 21/361; G02B 23/2453; G02B 26/08; G02B 26/0816; G02B 26/105; G02B 27/0025; G02B 27/0031; G02B 27/0081; G02B 27/0149; G02B 27/0176; G02B 27/0189; G02B 27/0994; G02B 27/1013; G02B 27/126; G02B 27/142; G02B 27/145; G02B 27/4222; G02B 27/642; G02B 30/24; G02B 3/0037; G02B 3/08; G02B 5/003; G02B 5/0252; G02B 5/0278; G02B 5/04; G02B 5/10; G02B 5/20; G02B 5/22; G02B 5/305; G02B 5/3083; G02B 6/0005; G02B 6/0006; G02B 6/0023; G02B 6/0033; G02B 6/0038; G02B 6/0045; G02B 6/0053; G02B 6/0056; G02B 6/0068; G02B 6/0073; G02B 6/0083; G02B 6/0085; G02B 6/0086; G02B 6/0088; G02B 6/065; G02B 6/3632; G02B 6/3652; G02B 6/4249; G02B 6/443; G02B 7/00; G02B 7/006; G02B 7/09; G02B 7/1821; G01N 15/1459; G01N 35/08; G01N 15/1404; G01N 15/1484; G01N 2015/0065; G01N 2015/1081; G01N 2015/149; G01N 2021/6439; G01N 21/6428; G01N 21/6486; G01N 15/06; G01N 15/1056; G01N 15/1434; G01N 2015/003; G01N 2015/0088; G01N 2015/0687; G01N 2015/0693; G01N 2015/1006; G01N 2015/1411; G01N 2015/1413; G01N 2015/1481; G01N 2021/6417; G01N 2021/6484; G01N 2021/7723; G01N 2035/00148; G01N 2035/00237; G01N 2035/00326; G01N 2035/00376; G01N 2035/00465; G01N 2035/00841; G01N 2035/00851; G01N 2035/0436; G01N 2035/0477; G01N 21/17; G01N 21/3563; G01N 21/49; G01N 21/6402; G01N 21/7703; G01N 21/774; G01N 2201/06113; G01N 27/06; G01N 27/4118; G01N 27/44739; G01N 27/44747; G01N 27/44791; G01N 33/5011; G01N 33/5044; G01N 33/54366; G01N 33/573; G01N 33/6863; G01N 35/00029; G01N 35/00732; G01N 35/00871; G01N 35/10; G01N 21/8806; G01N 21/9501; G01N 21/956; G01N 2201/068; G01N 2201/0683; G01N 2201/0697; G01N 2201/10; G01N 2201/12; G01N 15/1463; G01N 15/1475; G01N 2015/1062; G01N 2015/1075; G01N 2015/1438; G01N 2015/1477; G01N 2021/6419; G01N 2021/6421; G01N 2021/6441; G01N 2021/8835; G01N 2035/00881; G01N 21/1702; G01N 21/4795; G01N 21/552; G01N 21/67; G01N 21/718; G01N 21/8851; G01N 2201/0806; G01N 27/44721; G01N 33/2888; G01J 1/0474; G01J 1/0271; G01J 1/0407; G01J 1/44; G01J 2004/001; G01J 3/0218; G01J 4/04; G01J 1/0204; G01J 1/0403; G01J 1/0411; G01J 1/0422; G01J 1/0425; G01J 1/42; G01J 1/4204; G01J 1/4228; G01J 2003/425; G01J 3/0208; G01J 3/021; G01J 3/0216; G01J 3/0289; G01J 3/0294; G01J 3/18; G01J 3/42; G01J 3/4406; G01J 3/443; G01J 3/506; G01J 5/0014; G01J 5/043; G01J 5/0806; G01J 5/0818; G01J 5/089

See application file for complete search history.

(56) References Cited

U.S. PATENT DOCUMENTS

| | | | |
|---|---|---|---|
| 7,573,576 B2 * | 8/2009 | Mordau | B60S 1/0822 356/445 |
| 2017/0001601 A1 * | 1/2017 | Lee | B60S 1/0837 |
| 2017/0291581 A1 * | 10/2017 | Park | G01N 21/552 |
| 2017/0291582 A1 * | 10/2017 | Park | G01J 1/0414 |

* cited by examiner

DROPLET SENSOR

CROSS-REFERENCE TO RELATED APPLICATIONS

This application is based on and claims priority to Japanese Patent Application No. 2019-064983 filed on Mar. 28, 2019, the entire contents of which are incorporated herein by reference.

BACKGROUND OF THE INVENTION

1. Field of the Invention

Embodiments discussed herein are related to a droplet sensor that detects droplets, such as raindrops, drops of water, or the like.

2. Description of the Related Art

Examples of conventional sensors that detect raindrops or drops of water (hereinafter also referred to as "droplets") are described in Japanese Laid-Open Patent Publication No. 2014-211358 (now Japanese Patent No. 6094354), and Japanese Laid-Open Patent Publication No. 2014-238383 (now Japanese Patent No. 6167799), for example. These sensors detect the droplets by utilizing a change in the reflectivity of a transparent plate when the droplets adhere to a droplet detection area of the transparent plate. More particularly, light emitted from a light emitting device is reflected at the surface of the transparent plate, and the reflected light is received by a light receiving device. When the droplets adhere to the droplet detection area, the reflectivity at an interface of the transparent plate contacting the droplets changes, to change an amount of light received by the light receiving device. Hence, the existence of the droplets adhered to the droplet detection area can be detected from the change in the amount of light received by the light receiving device.

However, the optical devices used in the conventional sensors have a complex shape that is difficult to manufacture. As a result, it is difficult to manufacture the sensors at a low cost.

SUMMARY OF THE INVENTION

One object of the embodiments is to reduce the cost and weight of the droplet sensor.

According to one aspect of the embodiments, a droplet sensor includes an optical cover having an elliptical surface forming a portion of a spheroid; a light source arranged at or in a vicinity of a first focal point of the elliptical surface; and a photodetector arranged at or in a vicinity of a second focal point of the elliptical surface, wherein the elliptical surface includes an effective detection area configured to reflect light emitted from the light source towards the photodetector, an amount of light reflected from the effective detection area changes according to adhesion of a droplet on the effective detection area of the elliptical surface, and the optical cover includes a hollow portion that is provided in a region inside the optical cover, and outside optical paths of the light emitted from the light source and reflected from the effective detection area toward the photodetector.

Other objects and further features of the present invention will be apparent from the following detailed description when read in conjunction with the accompanying drawings.

DESCRIPTION OF THE PREFERRED EMBODIMENTS

As an example, Japanese Laid-Open Patent Publication No. 2019-120567 (or International Publication No. WO 2019/139844 A1) proposes a droplet sensor that has a simple structure and is easily manufactured. The proposed droplet sensor includes an optical cover, a light source, and a photodetector. The optical cover has a shape that is obtained when a spheroid is cut along a plane including a major axis of the spheroid. The light source is arranged at a first focal position of the spheroid, and the photodetector is arranged at a second focal position of the spheroid.

With this proposed droplet sensor, it is possible to maximize an effective detection area that satisfies the total reflection condition at an interface with gas (for example, air), and does not satisfy the total reflection condition at an interface with liquid (for example, water), by adjusting the eccentricity of the spheroid. As a result, the sensitivity of the droplet sensor can be improved. Further, because the droplet sensor has the simple structure and is easy to manufacture, it is possible to reduce the cost of the droplet sensor.

However, there are demands to further reduce the cost and the weight of the droplet sensor, and such demands are taken into consideration in embodiments of the present invention described hereinafter.

The embodiments of the present invention will be described, by referring to the drawings. In the drawings, those parts that are the same are designated by the same reference numerals, and a repeated description of the same parts may be omitted.

In a droplet sensor according to each of the embodiments, the existence of the droplet is optically detected by utilizing a change in the reflectivity at a boundary surface of an optical cover caused by the different reflectivities of gas and liquid contacting the optical cover at the boundary surface. The droplet sensor may be applied to the detection of droplets other than raindrops, including droplets of any liquid. The droplet sensor may detect moisture condensation, droplets of water, droplets of ink, or the like, for example. For the sake of convenience, the embodiments are described for examples in which the droplet sensor is applied to a rain sensor that detects raindrops as an example of the drops of liquid. It is also assumed for the sake of convenience that air is an example of the ambient gas of the droplet sensor.

First Embodiment

Figure 1:
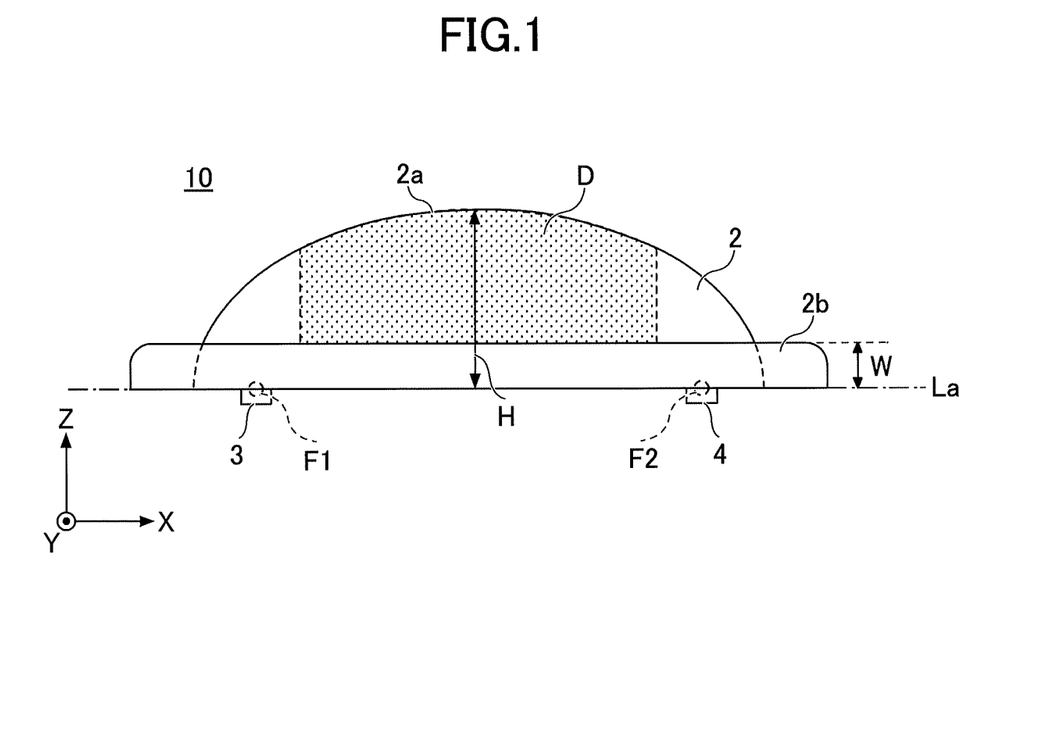
FIG. 1 is a diagram illustrating an outline of a rain sensor according to a first embodiment.

FIG. 1 is a diagram illustrating an outline of a rain sensor 10 according to a first embodiment. The rain sensor 10 detects raindrops adhered thereto. From a detection result of the raindrops detected by the rain sensor 10, it is possible to measure the amount of rainfall per unit time and/or per unit area.

The rain sensor 10 includes an optical cover 2, a light emitting device 3, and a light receiving device 4. The optical cover 2 includes an elliptical surface 2a, and a flange portion 2b. The light emitting device 3 is arranged at a first focal point F1 or a vicinity thereof on the elliptical surface 2a. The light receiving device 4 is arranged at a second focal point F2 or a vicinity thereof on the elliptical surface 2a. The light emitting device 3 is an example of a light source, and the light receiving device 4 is an example of a photodetector.

The optical cover 2 is a solid member forming a portion of a spheroid. The optical cover 2 is made of a material that is transparent with respect to a wavelength of light emitted from the light emitting device 3. In the example illustrated in FIG. 1, the spheroid has a three-dimensional shape that is obtained when an ellipse having a major axis La along the X-direction and a minor axis along the Y-direction is rotated around the major axis La. The optical cover 2 has a shape that is obtained when the spheroid is cut along a plane parallel to the XY-plane including the major axis La. For the sake of convenience, the Z-direction in FIG. 1 corresponds to a height direction of the optical cover 2.

The optical cover 2 may be made of a resin, such as polycarbonate, acryl, or the like, transparent ceramics, glass, plastics having a high refractive index, or the like.

The flange portion 2b extends in the direction of the XY-plane from a lower portion of the optical cover 2. The flange portion 2b has a planar shape that is a circular shape or an ellipse shape, for example. The planar shape of the flange portion 2b is not particularly limited, and may be a rectangular shape or other shapes. The flange portion 2b has a constant thickness W along the Z-direction. The thickness W of the flange portion 2b is approximately 25% of a height H of the optical cover 2, for example. The flange portion 2b functions as a mounting portion that is used to fix the optical cover 2 on a substrate or the like. The thickness W of the flange portion 2b may be less than 25% of the height H of the optical cover 2, provided that a sufficient strength can be secured with respect to stress associated with the fixing of the optical cover 2, so that the flange portion 2b is not damaged when screws used to mount the optical cover 2 on the substrate are tightened.

The light emitting device 3 may be a light emitting diode that emits near-infrared light, for example. The light receiving device 4 may be a quantum well type light receiving element that is sensitive in a near-infrared range, for example. The light emitting device 3 emits the light toward the elliptical surface 2a of the optical cover 2. The light receiving device 4 receives the light emitted from the light emitting device 3 and reflected from the elliptical surface 2a of the optical cover 2. The light emitting device 3 and the light receiving device 4 may be mounted on the substrate that is not illustrated in FIG. 1.

In FIG. 1, an effective detection area D, indicated by a dot pattern, is included in the elliptical surface 2a. The effective detection area D is a region on the elliptical surface 2a where the light emitted from the light emitting device 3 is totally reflected when the air surrounds the optical cover 2. The effective detection area D is the region where the total reflection condition is satisfied. The shape of the effective detection area D is determined so that the total reflection condition is no longer satisfied only when the raindrop adheres to the effective detection area D. In other words, the effective detection area D is the region where the total reflection condition is satisfied at an interface between elliptical surface 2a of the optical cover 2 and the ambient air, and where the total reflection condition is not satisfied at an interface between the elliptical surface 2a of the optical cover 2 and the raindrop. Such properties of the effective detection area D depend on the reflectivity of the optical cover 2 and the eccentricity of the elliptical surface 2a.

When the optical cover 2 is made of a resin, such as polycarbonate, for example, having a reflectivity of 1.57, an incident angle $\theta_i$ to the effective detection area D becomes $44.3° < \theta i < 51.4°$. An incident angle $\theta_m$ to a maximum detection area that can detect the adhesion of the raindrop to the optical cover 2 is approximately $39.6° < \theta_m < 57.9°$, but in the first embodiment, the area satisfying the incident angle $\theta_i$ of $44.3° < \theta i < 51.4°$ is used as the effective detection area D. In this case, areas on both ends outside the range of $44.3° < \theta i < 51.4°$ need to be masked so as not to function as an effective detection area.

The eccentricity of the elliptical surface 2a of the optical cover 2 is determined by a ratio of a distance from a center of the elliptical surface 2a to a focal point, and a semi-major axis of the elliptical surface 2a. When the reflectivity of the optical cover 2 is 1.57, the effective detection area D becomes a maximum when the eccentricity is 0.781. The effective detection area D may have the shapes described in Japanese Laid-Open Patent Publication No. 2019-120567 (or International Publication No. WO 2019/139844 A1), for example.

As described above, the flange portion 2b functions as the mounting portion that is used to fix the optical cover 2 on the substrate or the like. Because the light reflected from a region that is approximately 25% of the height H of the optical cover 2 or less is virtually undetectable by the light receiving device 4, this region that is approximately 25% of the height H of the optical cover 2 or less forms the flange portion 2b that functions as the mounting portion. The flange portion 2b is formed in this manner because the rain sensor 10 has a high detection sensitivity with respect to the light in the vertical direction (Z-direction) from above the rain sensor 10, and has a low detection sensitivity with respect to the light in the horizontal direction (X-direction and Y-direction) from the side of the rain sensor 10. By utilizing the region of the optical cover 2, having the low detection sensitivity, as the flange portion 2b, it is possible to provide the flange portion 2b, that functions as the mounting portion, virtually without deteriorating the detection sensitivity of the rain sensor 10.

Figure 2:
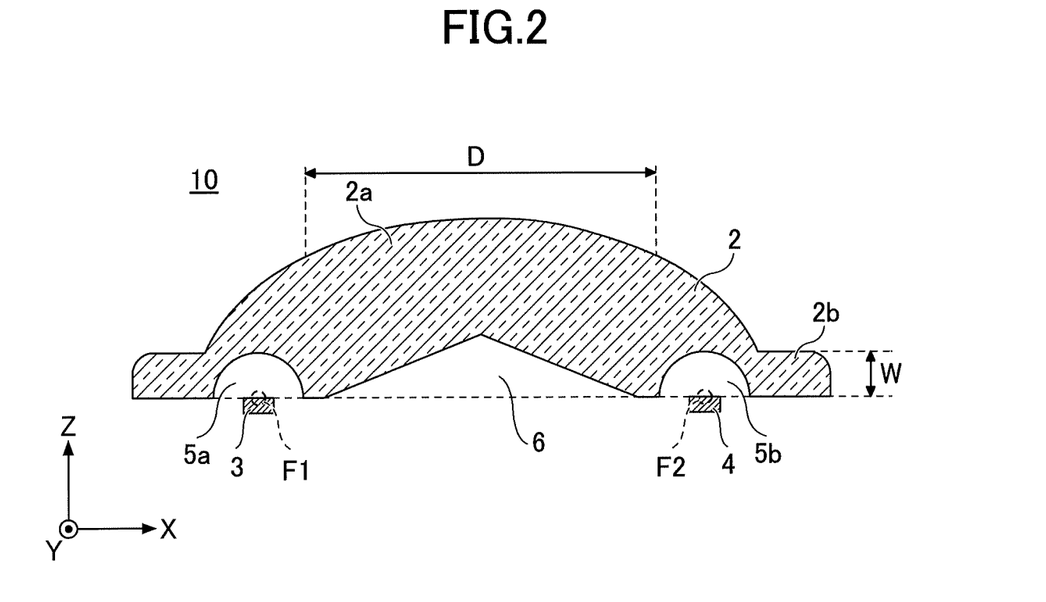
FIG. 2 is a cross sectional view of the rain sensor illustrated in FIG. 1 cut along a XZ-plane that includes a major axis.
Figure 3:
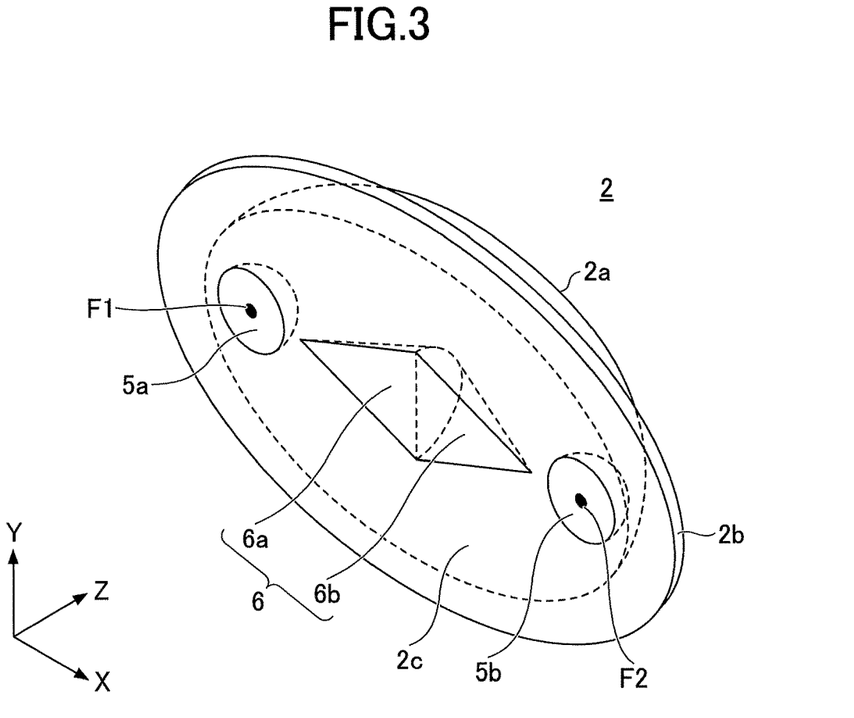
FIG. 3 is a perspective view of an optical cover viewed from a bottom surface thereof.

FIG. 2 is a cross sectional view of the rain sensor 10 illustrated in FIG. 1 cut along a XZ-plane that includes the major axis La. FIG. 3 is a perspective view of the optical cover 2 viewed from a bottom surface 2c thereof.

As illustrated in FIG. 2 and FIG. 3, a first space 5a, a second space 5b, and a hollow portion 6 are formed inside the optical cover 2. The first space 5a has a hemispherical shape having the first focal point F1 as its center. The light emitting device 3 is arranged in the first space 5a, and an interface between the first space 5a and the optical cover 2 is a transmitting mirror surface. The second space 5b has a hemispherical shape having the second focal point F2 as its center. The light receiving device 4 is arranged in the second space 5b, and an interface between the second space 5b and the optical cover 2 is a transmitting mirror surface or a transmitting scattering surface.

In the first embodiment, the radius of each of the first space 5a and the second space 5b is approximately the same as the thickness W of the flange portion 2b.

Because the first space 5a is defined by the spherical surface, the light emitted from the light emitting device 3 enters inside the optical cover 2 without being diffracted. Similarly, because the second space 5b is defined by the spherical surface, the light reflected from the elliptical surface 2a enters the second space 5b without being diffracted. Hence, the rain sensor 10 can utilize the basic properties of the spheroid in that the light emitted from one focal point of the ellipsoid is focused at the other focal point of the ellipsoid.

The hollow portion 6 is provided in a region inside the optical cover 2 not affecting optical paths of the light incident to the effective detection area D nor optical paths of the light reflected from the effective detection area D. In the first embodiment, the hollow portion 6 has a shape that is obtained when a biconical shape having the major axis La as a center axis thereof is cut along the XZ-plane including the major axis La. More particularly, the hollow portion 6 has the shape that is obtained when a bottom surface of a first hemiconical portion 6a and a bottom surface of a second hemiconical portion 6b are connected at a YZ-plane including a minor axis of the elliptical surface 2a. The first hemiconical portion 6a and the second conical portion 6b may have approximately the same size. The hemiconical shape refers to a shape that is obtained when a conical shape is cut along a plane including a center axis thereof.

Figure 4:
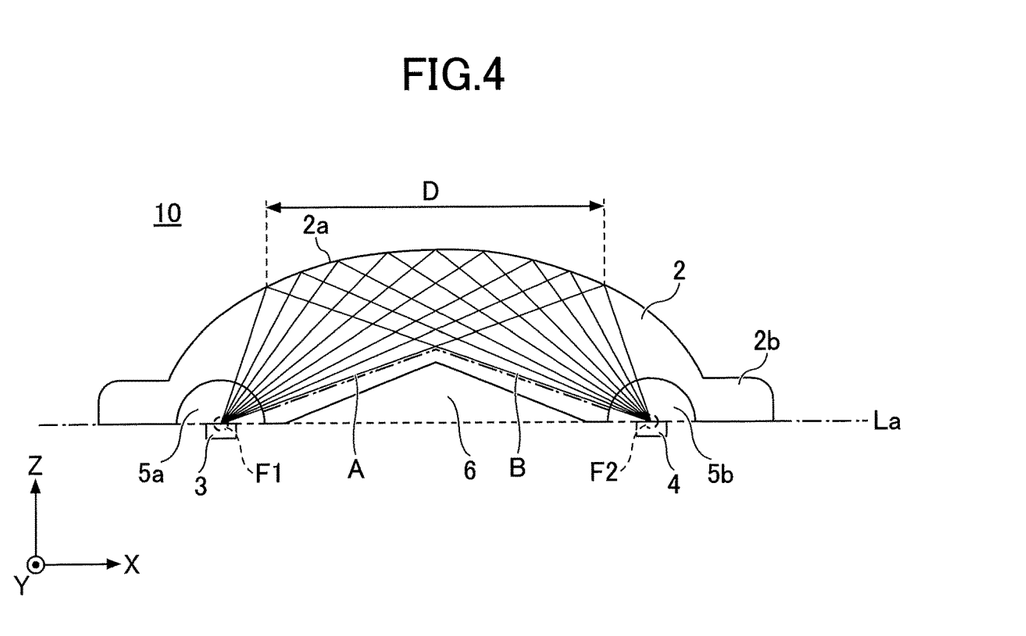
FIG. 4 is a diagram illustrating optical paths of light emitted from a light emitting device and received by a light receiving device.

The shape of the first hemiconical portion 6a or the second hemiconical portion 6b may be modified, so that a lower portion of the optical cover 2 below a one-dot chain line in FIG. 4 is thicker than an upper portion of the optical cover 2. In this case, the first hemiconical portion 6a and the second hemiconical portion 6b may have different sizes.

FIG. 4 is a diagram illustrating optical paths of light emitted from the light emitting device 3 and received by the light receiving device 4. As illustrated in FIG. 4, the hollow portion 6 is preferably as large as possible outside the optical paths, from a viewpoint of reducing the cost and receiving the weight of the optical cover 2.

More particularly, as illustrated in FIG. 4, the hollow portion 6 has a shape with a maximum size when a biconical shape, that is obtained by rotating a triangle formed by an optical path A of the light from the light emitting device 3 toward the end of the effective detection area D farthest away from the light emitting device 3, an optical path B of the light reflected from the end of the effective detection area D closest to the light emitting device 3 toward the light receiving device 4, and the major axis La of the elliptical surface 2a, around the major axis La, is cut along the XZ-plane including the major axis La. The hollow portion 6 may be formed by hollowing a portion of the optical cover 2 to have the shape with the maximum size. In actual practice, the optical cover 2 may be hollowed along the one-dot chain line in FIG. 4, for example, to the shape with the maximum size, so as not to include the optical path A nor the optical path B. In the first embodiment, by taking into consideration the fact that the light emitting portion of the light emitting device 3 has a finite size, the hollow portion 6 is set to a shape smaller than the shape with the maximum size.

Figure 5:
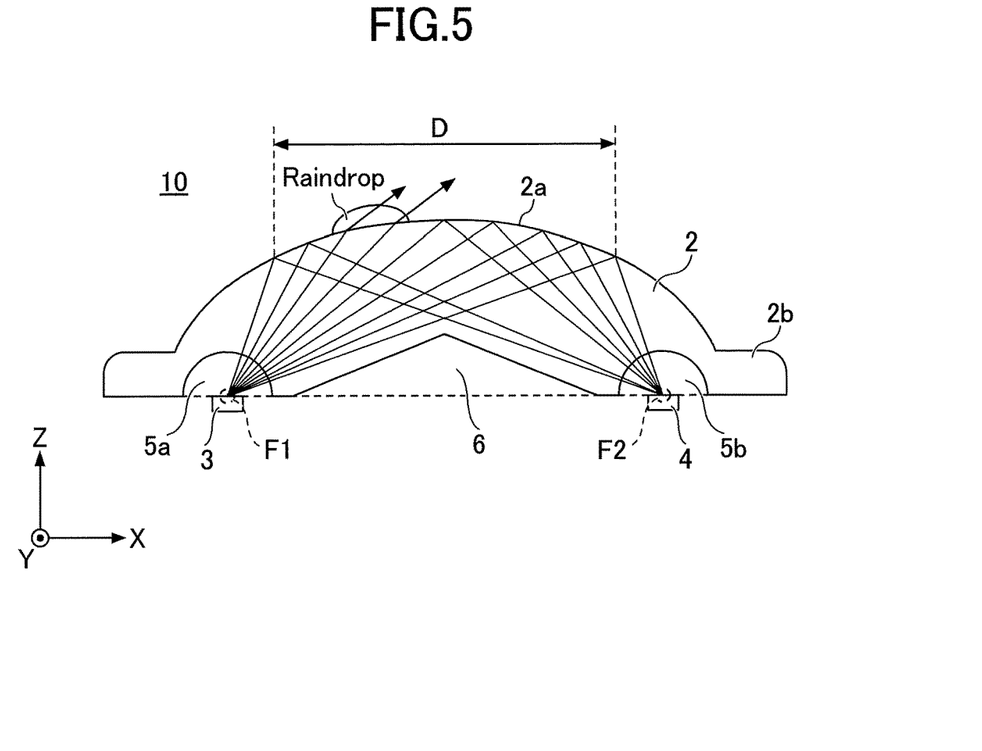
FIG. 5 is a diagram illustrating an example of a change in the optical path caused by a raindrop adhered to an effective detection area.

FIG. 5 is a diagram illustrating an example of a change in the optical path caused by the raindrop adhered to the effective detection area D. As illustrated in FIG. 5, when the raindrop adheres to the effective detection area D, the reflectivity at the interface of the effective detection area D changes at the raindrop, to no longer satisfy the total reflection condition, to thereby transmit the incident light from the light emitting device 3. As a result, the amount of reflected light at the effective detection area D decreases, to decrease the amount of light received by the light receiving device 4. The existence of the raindrop and the amount of the raindrop adhered to the effective detection area D can be detected by monitoring a change in the amount of light received by the light receiving device 4.

A portion of the light emitted from the light emitting device 3 but not reaching the effective detection area D reaches the surface of the optical cover 2 defining the hollow portion 6. This portion of the light that reaches the surface of the optical cover 2 defining the hollow portion 6 is invalid light not contributing to the raindrop detection, and a DC offset is generated in a detection signal output from the light receiving device 4 when this portion of the light reaches the light receiving device 4. Provided that a dynamic range required for the raindrop detection is secured, the DC offset does not affect the functions or performance of the rain sensor 10.

Accordingly, by forming the hollow portion 6 outside the optical paths of the optical cover 2, it is possible to reduce the cost and the weight of the rain sensor 10 without adversely affecting the functions or performance of the rain sensor 10. In addition, when forming the optical cover 2 by injection molding, for example, it is possible to reduce the molding time, and to reduce the cost of the production unit.

Further, when the optical cover 2 is formed by the injection molding, a thick portion of the optical cover 2 sinks to thereby form a molding sink due to deformation caused by the resin that shrinks during a cooling process after the molding. In the first embodiment, the thickness of the optical cover 2 can be reduced by forming the hollow portion 6, to effectively reduce the molding sink and to reduce the cost of the optical cover 2.

Next, further embodiments will be described in conjunction with FIG. 6 through FIG. 15.

Second Embodiment

Figure 6:
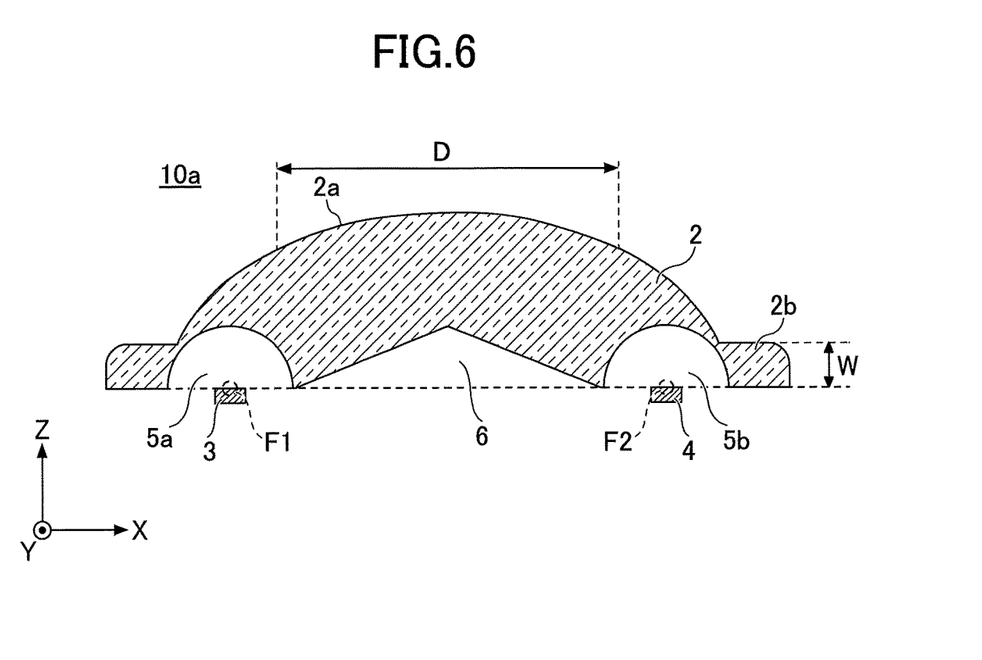
FIG. 6 is a cross sectional view illustrating a structure of the rain sensor according to a second embodiment.

FIG. 6 is a cross sectional view illustrating a structure of a rain sensor 10a according to a second embodiment. The rain sensor 10a according to the second embodiment differs from the rain sensor 10 according to the first embodiment, in that the first space 5a and the second space 5b respectively have a radius greater than the thickness W of the flange portion 2b. Otherwise, the rain sensor 10a is the same as the rain sensor 10. As illustrated in FIG. 6, the radius of the first space 5a and the second space 5b is made as large as possible, so as to further reduce the cost and the weight of the optical cover 2.

Even when the radius of the first space 5a and the second space 5b is large, the optical paths of the optical cover 2 are not adversely affected, and the raindrop detection of the rain sensor 10a is not adversely affected, as long as the surfaces of the optical cover 2 defining the first space 5a and the second space 5b are spherical surfaces.

Third Embodiment

In a rain sensor 10b according to a third embodiment, the surface of the optical cover 2 defining the hollow portion 6 is formed by a sand surface (or scattering surface) that scatters the incoming light. As described above, provided that the dynamic range required for the raindrop detection is secured, the DC offset does not affect the functions or performance of the rain sensor 10b even the light from the light emitting device 3 reaches the surface of the optical cover 2 defining the hollow portion 6. On the other hand, when the DC offset is large and the dynamic range required for the raindrop detection cannot be sufficiently secured, the DC offset can be reduced by defining the hollow portion 6 by the scattering surface of the optical cover 2, to thereby secure the dynamic range required for the raindrop detection.

Figure 7:
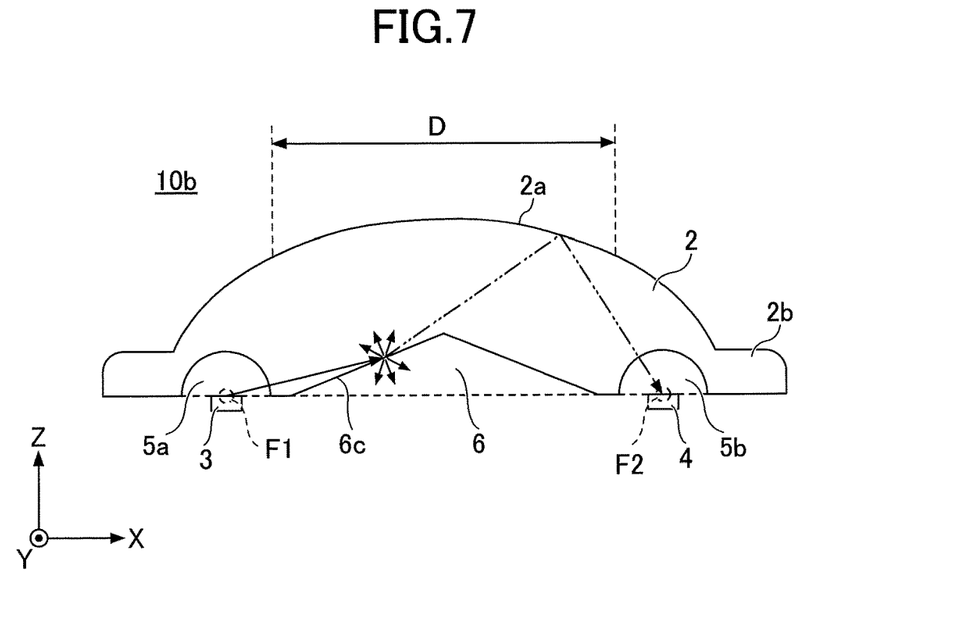
FIG. 7 is a diagram for explaining the effects of the rain sensor according to a third embodiment.

FIG. 7 is a diagram for explaining the effects of the rain sensor 10b according to the third embodiment. When the surface of the optical cover 2 defining the hollow portion 6 is not a scattering surface, a portion of the light emitted from the light emitting device 3 may be reflected by a surface 6c defining the hollow portion 6, and reach the light receiving device 4 after being reflected by the elliptical surface 2a, as indicated by a two-dot chain line in FIG. 7. Depending on the condition, this portion of the light reaching the light receiving device 4 may deteriorate the dynamic range and deteriorate the raindrop detection accuracy.

But when the surface 6c defining the hollow portion 6 is formed by the scattering surface, the portion of the light emitted from the light emitting device 3 is scattered by the surface 6c. Hence, the amount of this portion of the light, not required for the raindrop detection, reaching the light receiving device 4 after being scattered, can be reduced as indicated by a solid line in FIG. 7. The surface roughness of the surface 6c may be appropriately set by taking into account the scattering effect.

Fourth Embodiment

Figure 8:
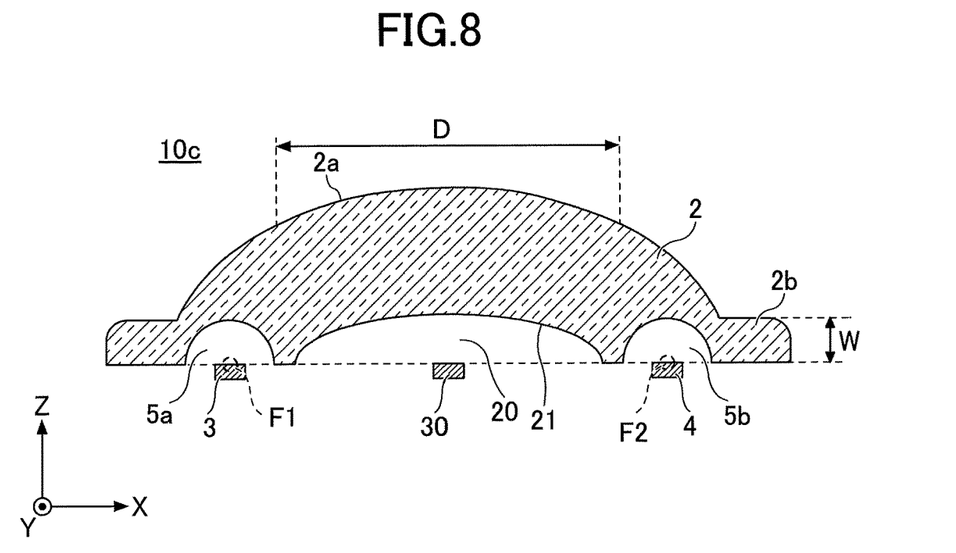
FIG. 8 is a cross sectional view illustrating the structure of the rain sensor according to a fourth embodiment.

FIG. 8 is a cross sectional view illustrating the structure of a rain sensor 10c according to a fourth embodiment. In the optical cover 2 of the rain sensor 10c according to the fourth embodiment, a hollow portion 20 has a shape different from the shape of the hollow portion 6 of the optical cover 2 of the rain sensor 10 according to the first embodiment. In addition, the rain sensor 10c according to the fourth embodiment is provided with a sensor 30 that is provided for the purposes of receiving extraneous light. The sensor 30 may be a light meter or the like, and is provided at a central portion of the elliptical surface 2a of the optical cover 2.

As illustrated in FIG. 8, the hollow portion 20 of the optical cover 2 of the rain sensor 10c is defined by an elliptical surface 21 of the optical cover 2. The hollow portion 20 has a shape that is obtained when a spheroid, obtained by rotating an ellipse having a minor axis along the Y-direction around the major axis La, is cut along a plane parallel to the XY-plane including the major axis La. A center of the elliptical surface 21 of the hollow portion 20 coincides with the center of the elliptical surface 2a of the optical cover 2.

Similar to the first embodiment, the hollow portion 20 is provided in a region inside the optical cover 2 not affecting the optical paths of the light incident to the effective detection area D nor the optical paths of the light reflected from the effective detection area D. The eccentricity of the hollow portion 20 is preferably determined so that the shape of the hollow portion 20 inscribes the biconical shape of the hollow portion 6 in the first embodiment.

In addition, the elliptical surface 21 of the optical cover 2 defining the hollow portion 20 may be a sand surface (or scattering surface) that scatters the incoming light. In this case, the surface roughness of the elliptical surface 21 may be appropriately set by taking into account the scattering effect, similar to the third embodiment.

Figure 9:
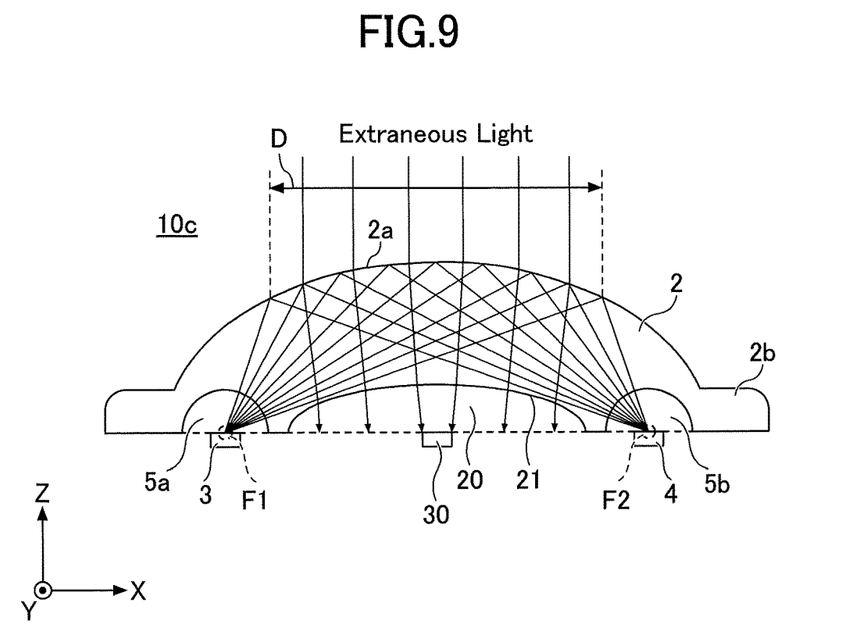
FIG. 9 is a diagram illustrating the optical path of the light emitted from the light emitting device and received by the light receiving device, and an optical path of extraneous light.

FIG. 9 is a diagram illustrating the optical path of the light emitted from the light emitting device 3 and received by the light receiving device 4, and an optical path of the extraneous light. As illustrated in FIG. 9, in the rain sensor 10c according to the fourth embodiment, the shape of the elliptical surface 2a of the optical cover 2 and the shape of the elliptical surface 21 of the optical cover 2 defining the hollow portion 20 contribute to increasing the probability of the extraneous light reaching and being detected by the sensor 30, and to increasing the detection sensitivity of the ambient brightness of the rain sensor 10c.

Figure 10:
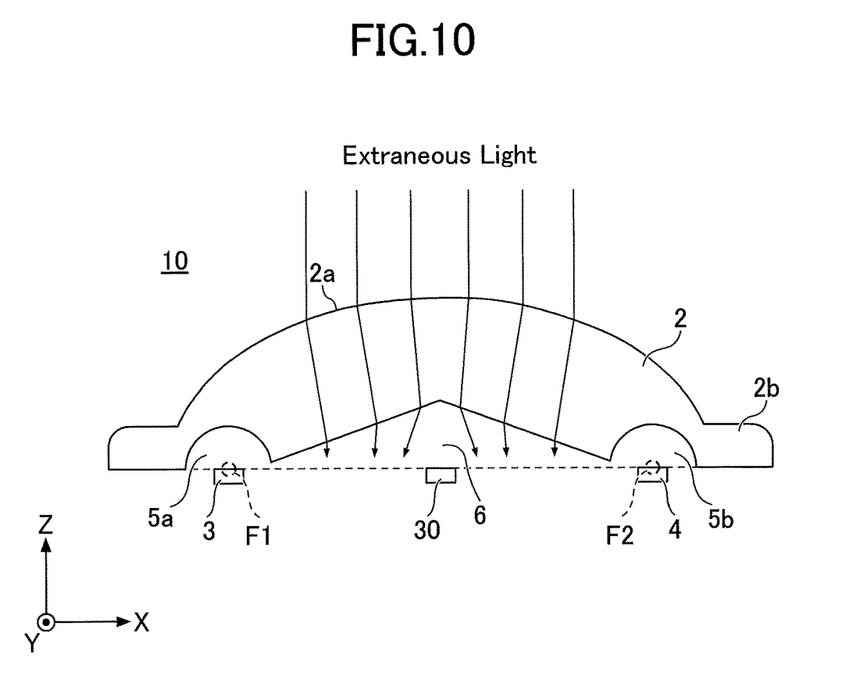
FIG. 10 is a diagram illustrating a comparison example provided with a sensor that receives the extraneous light in the rain sensor according to the first embodiment.

FIG. 10 is a diagram illustrating a comparison example provided with the sensor 30 that receives the extraneous light in the rain sensor according to the first embodiment. In this comparison example, the sensor 30 is arranged at the central portion of the elliptical surface 2a of the optical cover 2. Because the hollow portion 6 according to this comparison example has the biconical shape, the extraneous light from above the optical cover 2 is refracted at the surface of the optical cover 2 defining the hollow portion 6 in directions away from the sensor 30. For this reason, the extraneous light is unlikely to reach and be detected by the sensor 30, and this comparison example is unsuited for detecting the ambient brightness of rain sensor 10.

Accordingly, with the rain sensor 10c according to the fourth embodiment, it is possible to obtain an additional advantageous feature in that the extraneous light can be detected using the sensor such as the light meter or the like, in addition to reducing the cost and the weight of the rain sensor 10c.

Fifth Embodiment

Figure 11:
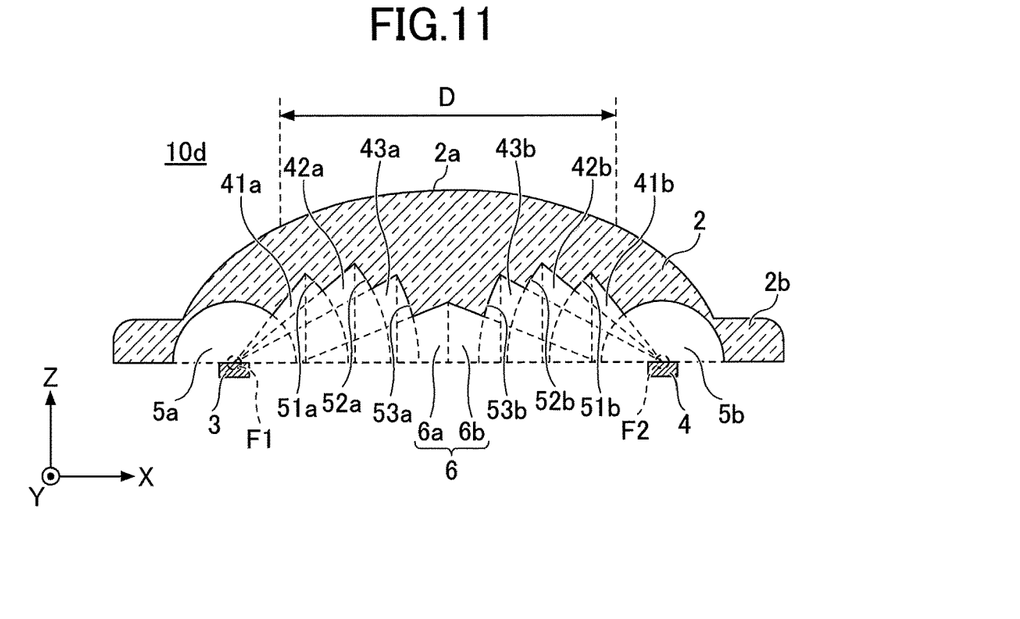
FIG. 11 is a cross sectional view illustrating the structure of the rain sensor according to a fifth embodiment.
Figure 12:
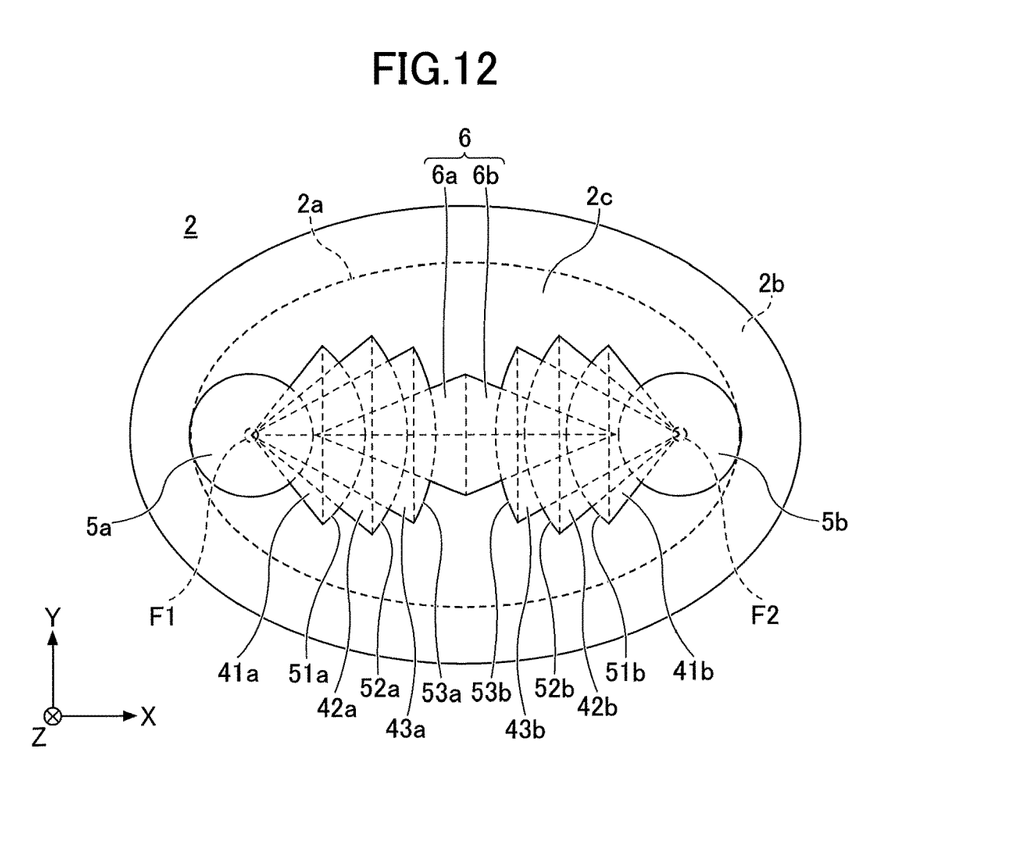
FIG. 12 is a bottom view of the optical cover of the rain sensor according to the fifth embodiment.

FIG. 11 is a cross sectional view illustrating the structure of a rain sensor 10d according to a fifth embodiment. FIG. 12 is a bottom view of the optical cover 2 of the rain sensor 10d according to the fifth embodiment, viewed from the bottom surface 2c of the optical cover 2. In the rain sensor 10d according to the fifth embodiment, cuts are formed in the optical paths inside the optical cover 2 so as not to change the course of the light, in addition to forming the hollow portion 6 outside the optical paths of the optical cover 2.

As illustrated in FIG. 11 and FIG. 12, the hollow portion 6 formed in the optical cover 2 has a biconical shape that is the same as that of the first embodiment. The first space 5a and the second space 5b in the fifth embodiment have the hemispherical shape, but the radius of the first space 51 and the second space 5b is made as large as possible as in the second embodiment.

The cuts are famed by a plurality of fan-shaped wedges (or cuneiforms) having apexes thereof formed by the first focal point F1, and a plurality of fan-shaped wedges having apexes thereof formed by the second focal point F2. The fan-shaped wedge has a wedge-like shape that is obtained by rotating a fan shape around a rotation axis (or center axis) passing through the apex of the fan shape. A bottom surface of the fan-shaped wedge is formed by a portion of the spherical surface. That is, each fan-shaped wedge has a spherical bottom surface.

In the fifth embodiment, the plurality of fan-shaped wedges having the apexes thereof formed by the first focal point F1 include a first fan-shaped wedge 41a, a second fan-shaped wedge 42a, and a third fan-shaped wedge 43a. The apexes of the first fan-shaped wedge 41a, the second fan-shaped wedge 42a, and the third fan-shaped wedge 43a coincide with the first focal point F1. The rotation axes of the first fan-shaped wedge 41a, the second fan-shaped wedge 42a, and the third fan-shaped wedge 43a coincide with the major axis La.

Figure 13:
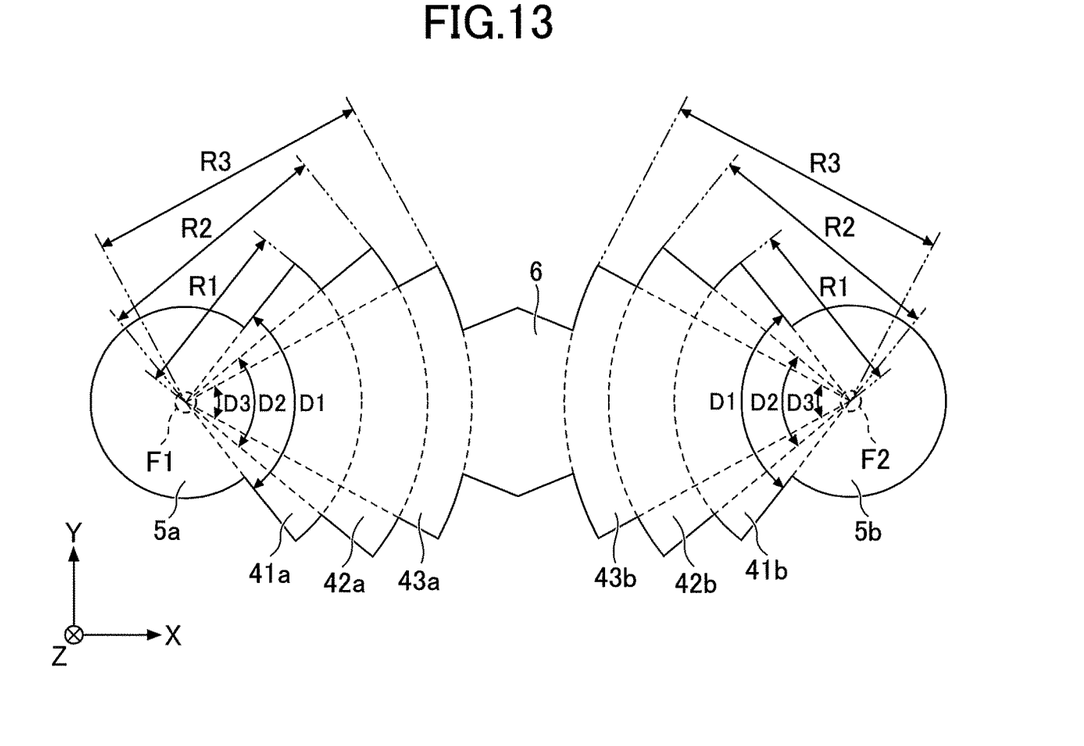
FIG. 13 is a diagram for explaining relationships of apex angles and radii of a plurality of fan-shaped wedges forming cuts.

FIG. 13 is a diagram for explaining relationships of apex angles and radii of the plurality of fan-shaped wedges forming cuts. As illustrated in FIG. 13, an apex angle D1 of the first fan-shaped wedge 41a is larger than an apex angle D2 of the second fan-shaped wedge 42a, and the apex angle D2 of the second fan-shaped wedge 42a is larger than an apex angle D3 of the third fan-shaped wedge 43a. A radius R1 of the first fan-shaped wedge 41a is shorter than a radius R2 of the second fan-shaped wedge 42a, and the radius R2 of the second fan-shaped wedge 42a is shorter than a radius R3 of the third fan-shaped wedge 43a. The radius of the fan-shaped wedge corresponds to a radius of the fan shape that is formed in an expansion plan when the fan-shaped wedge is unfolded.

Each of a bottom surface 51a of the first fan-shaped wedge 41a, a bottom surface 52a of the second fan-shaped wedge 42a, and a bottom surface 53a of the third fan-shaped wedge 43a is a spherical surface having the first focal point F1 as its center.

Figure 15:
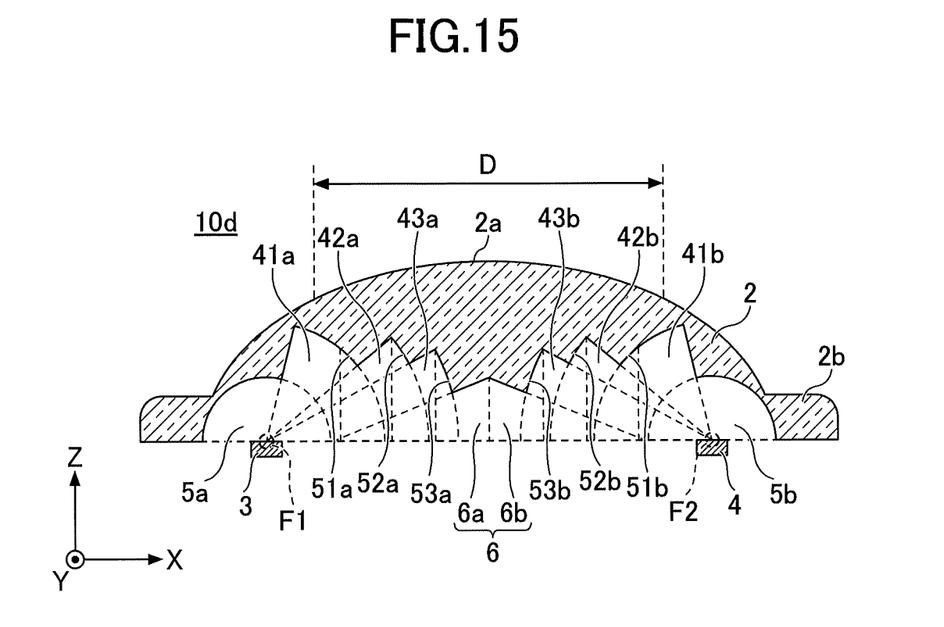
FIG. 15 is a diagram illustrating an example in which the shape of a first fan-shaped wedge is modified in the fifth embodiment.

The plurality of fan-shaped wedges having the apexes thereof formed by the second focal point F2 include a first fan-shaped wedge 41b, a second fan-shaped wedge 42b, and a third fan-shaped wedge 43b. The first fan-shaped wedge 41b, the second fan-shaped wedge 42b, and the third fan-shaped wedge 43b have the same shapes as the first fan-shaped wedge 41a, the second fan-shaped wedge 42a, and the third fan-shaped wedge 43a. The first fan-shaped wedge 41b, the second fan-shaped wedge 42b, and the third fan-shaped wedge 43b are line symmetric to the first fan-shaped wedge 41a, the second fan-shaped wedge 42a, and the third fan-shaped wedge 43a, with respect to the minor axis of the elliptical surface 2a. The shape of the first hemiconical portion 6a or the second hemiconical portion 6b illustrated in FIG. 15 may be modified so that the lower portion of the optical cover 2 is thicker than as illustrated in FIG. 15 below the one-dot chain line illustrated in FIG. 4. In this case, the first hemiconical portion 6a and the second hemiconical portion 6b may have shapes that are not line symmetrical to each other.

According to the fifth embodiment, the optical cover 2 includes, in addition to the hollow portion 6, the first space 5a, and the second space 5b, the fan-shaped wedges 51a through 43a and 41b through 43b, and these elements of the optical cover 2 as a whole forms a single space.

Figure 14:
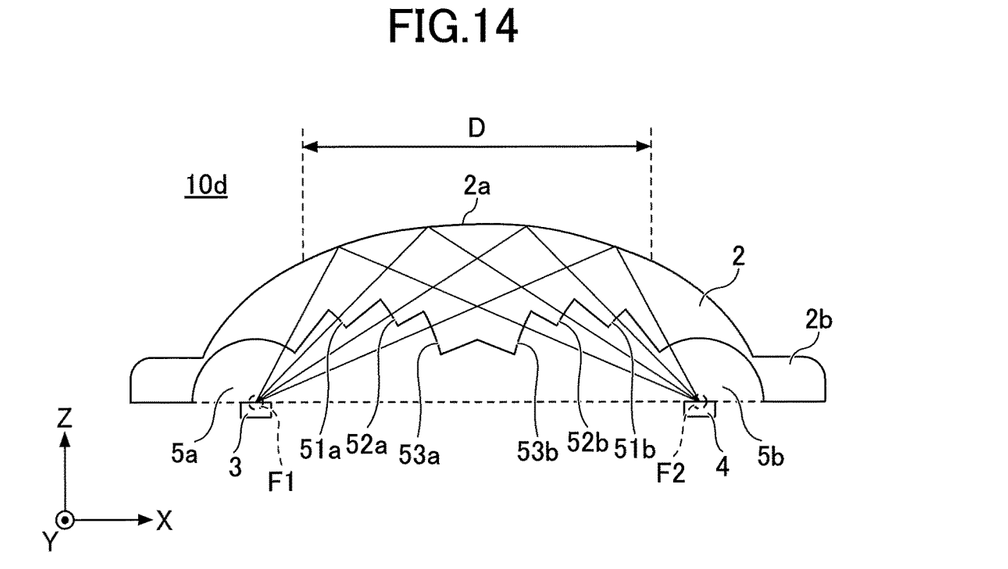
FIG. 14 is a diagram illustrating the optical paths of light emitted from the light emitting device and received by the light receiving device.

FIG. 14 is a diagram illustrating the optical paths of the light emitted from the light emitting device 3 and received by the light receiving device 4. As illustrated in FIG. 14, in the rain sensor 10d according to the fifth embodiment, a portion of the light emitted from the light emitting device 3 passes through the bottom surfaces 51a through 53a of the fan-shaped wedges 41a through 43a, and reaches the effective detection area D. The portion of the light reflected by the effective detection area D passes through the bottom surfaces 51b through 53b of the fan-shaped wedges 41b through 43b, and reaches the light receiving device 4.

Because the bottom surfaces 51a through 53a are spherical surfaces having the first focal point F1 as centers thereof, and the bottom surfaces 51b through 53b are spherical surfaces having the second focal point F2 as centers thereof, the light is perpendicularly incident to each bottom surface. For this reason, the course of the light is not changed by the cuts inside the optical cover 2, and the provision of the cuts does not adversely affect the detection sensitivity of the rain sensor 10d.

The number of fan-shaped wedges forming the cuts is not particularly limited, and the apex angle and the radius of each fan-shaped wedge may be modified as appropriate. For example, as illustrated in FIG. 15, the apex angle of the first fan-shaped wedges 41a and 41b may be increased, to extend the bottom surfaces 51a and 51b to regions on the outer sides of the effective detection area D. FIG. 15 is a diagram illustrating an example in which the shape of the first fan-shaped wedge is modified in the fifth embodiment. Because the light contributing to the raindrop detection does not pass through the regions on the outer sides of the effective detection area D, the portions of the bottom surfaces 51a and 51b extending to the regions on the outer sides of the effective detection area D do not need to have the spherical shapes. Similarly, portions of the surfaces of the optical cover 2 defining the first space 5a and the second space 5b, extending to the regions on the outer sides of the effective detection area D, do not need to have the spherical shape.

In addition, the bottom surfaces 51b through 53b of the fan-shaped wedges 41b through 43b may be formed by a sand surface (or scattering surface). In this case, it is possible to reduce variations in the detection sensitivity of the rain sensor 10d caused by positional errors of the light emitting device 3 and the light receiving device 4.

Further, the embodiments described above may be combined, as appropriate.

In the rain sensor according to the embodiments described heretofore, the light emitting device 3 and the light receiving device 4 are arranged at or in the vicinities of the first focal point F1 and the second focal point F2, respectively. However, depending on the shape and size of the light emitting portion of the light emitting device 3, the light emission profile of the light emitting device 3, and the shape and size of the light receiving portion of the light receiving device 4, the light emitting device 3 and the light receiving device 4 are preferably arranged so that a sensitivity characteristic on the effective detection area D becomes approximately flat.

Moreover, the disclosed droplet sensor is not only applicable to the rain sensor, but is similarly applicable to various sensors, such as moisture condensation sensor, or the like, for example. The rain sensor may be set on a roadside tree, a streetlight, or the like, to measure a local precipitation distribution, to collect weather information, or the like. The rain sensor may be provided in a vehicle and used to control a windshield wiper of the vehicle, for example. The moisture condensation sensor may be used in office automation machines, such as copying machines, server apparatuses, or the like, for example. Further, the rain sensor may be built into an environment sensor device, and used in combination with other sensors of the environment sensor device. The other sensors of the environment sensor device may include a temperature sensor, a wind direction sensor, an air flow sensor, or the like, for example.

According to the embodiments described above, it is possible to reduce the cost and the weight of the droplet sensor.

Although the embodiments are numbered with, for example, "first," "second," "third," "fourth," or "fifth," the ordinal numbers do not imply priorities of the embodiments.

Further, the present invention is not limited to these embodiments, but various variations, modifications, and substitutions of a part or all of the embodiments may be made without departing from the scope of the present invention.

What is claimed is:

1. A droplet sensor comprising:
   a transparent optical cover having a flat bottom surface, and an upper portion including an outer elliptical surface forming a portion of a spheroid;
   a light source arranged at or in a vicinity of a first focal point of the elliptical surface; and
   a photodetector arranged at or in a vicinity of a second focal point of the elliptical surface, wherein
   the elliptical, surface includes an of detection area configured to reflect light emitted from the light source towards the photodetector,
   an amount of light reflected from the effective detection area changes according to adhesion of a droplet on the effective detection area of the elliptical surface, and
   the optical cover includes
      a hollow portion provided in the bottom surface and extending, inside the optical cover, so as not to change a course of the light emitted from the light source and reflected from the effective detection area towards the photodetector,
      a first space opening at the bottom surface and including the first focal point, provided inside the optical cover on an outer side the hollow portion, and
      a second space, separate from the first space, opening at the bottom surface and including the second focal point, provided inside the optical cover on the outer side the hollow portion.

2. The droplet sensor as claimed in claim 1, wherein the optical cover has a first hemispheroid shape, and a major axis of the first hemispheroid shape lies on a plane including the bottom surface.

3. The droplet sensor as claimed in claim 2, wherein the hollow portion has a half biconical shape, and a center, major axis of the half biconical shape lies on the plane including the bottom surface.

4. The droplet sensor as claimed in claim 3, wherein the hollow portion has a height that decreases nonlinearly from a center axis thereof towards the first space and the second space.

5. The droplet sensor as claimed in claim 1, wherein the hollow portion has a height that decreases linearly from a center axis thereof towards the first space and the second space.

6. The droplet sensor as claimed in claim 2, wherein the hollow portion has a second hemispheroid shape, and a center, major axis of the second hemispheroid shape lies on the plane including the bottom surface.

7. The droplet sensor as claimed in claim 6, wherein the second hemispheroid shape inscribes a biconical shape having a center, major axis coinciding with the center, major axis of the second hemispheroid shape.

8. The droplet sensor as claimed in claim 1, wherein an inner surface of the optical cover defining the hollow portion is a scattering surface.

9. The droplet sensor as claimed in claim 1, further comprising:
   a sensor, arranged at a center of the elliptical surface, and configured to detect extraneous light,
   wherein the center of the elliptical surface coincides with a center of the hollow portion.

10. The droplet sensor as claimed in claim 1, wherein the optical cover includes a plurality of cuts formed inside the optical cover and forming an inner surface of the optical cover defining the hollow portion, so as not to change a course of the light.

11. A droplet sensor comprising:
    an optical cover having an elliptical surface forming a portion of a spheroid;
    a light source arranged at or in a vicinity of a first focal point of the elliptical surface; and
    a photodetector arranged at or in a vicinity of a second local point of the elliptical surface, wherein
    the elliptical surface includes an effective detection area configured to reflect light emitted from the light source towards the photodetector,
    an amount of light reflected from the effective detection area changes according to adhesion of a droplet on the effective detection area of the elliptical surface,
    the optical cover includes a hollow portion that is provided in a region inside the optical cover, and a plurality of cuts formed inside the optical cover and defining the hollow portion, so as not to change a course of the light emitted from the light source and reflected from the effective detection area towards the photodetector,
    the plurality of cuts include a plurality of first fan-shaped wedges having the first focal point as apexes thereof, and a plurality of second fan-shaped wedges having the second focal point as apexes thereof,
    each of the plurality of first fan-shaped wedges and the plurality of second fan-shaped wedges has a wedge-like shape corresponding to a shape that is obtained by rotating a fan shape around a rotation axis passing through the apex of the fan shape,
    each of the plurality of first fan-shaped wedges and the plurality of second fan-shaped wedges includes a spherical bottom surface, and
    the light from the light source passes through the spherical bottom surface of each of the plurality of first fan-shaped wedges and the plurality of second fan-shaped wedges before reaching the photodetector.

12. The droplet sensor as claimed in claim 11, wherein the spherical bottom surface of each of the plurality of first fan-shaped wedges and the plurality of second fan-shaped wedges is formed by a scattering surface.

13. A droplet sensor comprising:
    an optical cover having an elliptical surface forming a portion of a spheroid;
    a light source arranged at or in a vicinity of a first focal point of the elliptical surface; and a photodetector arranged at or in a vicinity of a second focal point of the elliptical surface, wherein the elliptical surface includes an effective detection area configured to reflect light emitted from the light source towards the photodetector, an amount of light reflected from the effective detection area changes according to adhesion of a droplet on the effective detection area of the elliptical surface, the optical cover includes a hollow portion that is provided in a region inside the optical cover, and outside optical paths of the light emitted from the light source and reflected from the effective detection area towards the photodetector, the optical cover includes a first spherical space having the first focal point as its center, and a second spherical space having the second focal point as its center, and the light source is arranged in the first spherical space, and the photodetector is arranged in the second spherical space.

14. The droplet sensor as claimed in claim 1, wherein the hollow portion is provided outside optical paths of the light emitted from the light source and reflected from the effective detection area towards the photodetector.

15. The droplet sensor as claimed in claim 1, wherein the hollow portion is provided at a center portion of the optical cover, and the first space and the second space are provided at symmetrical positions with respect to a center axis of the hollow portion.

16. The droplet sensor as claimed in claim 10, wherein the plurality of cuts include a plurality of first fan-shaped wedges having the first focal point as apexes thereof, and a plurality of second fan-shaped wedges having the second focal point as apexes thereof, each of the plurality of first fan-shaped wedges and the plurality of second fan-shaped wedges has a wedge-like shape corresponding to a shape that is obtained by rotating a fan shape around a rotation axis passing through the apex of the fan shape, each of the plurality of first fan-shaped wedges and the plurality of second fan-shaped wedges includes a spherical bottom surface, and the light from the light source passes through the spherical bottom surface of each of the plurality of first fan-shaped wedges and the plurality of second fan-shaped wedges before reaching the photodetector.

17. The droplet sensor as claimed in claim 16, wherein the spherical bottom surface of each of the plurality of first fan-shaped wedges and the plurality of second fan-shaped wedges is formed by a scattering surface.

18. The droplet sensor as claimed in claim 1, wherein the first space has a first spherical shape including the first focal point as its center, the second space has a second spherical shape including the second focal point as its center, the light source is arranged in the first space, and the photodetector is arranged in the second space.

19. The droplet sensor as claimed in claim 1, wherein the light emitted from the light source travels through the first space towards the elliptical surface, and the light reflected from the elliptical surface travels through the second space towards the photodetector.

* * * * *